United States Patent
Nakajima

(10) Patent No.: US 6,415,370 B1
(45) Date of Patent: Jul. 2, 2002

(54) SEMICONDUCTOR INTEGRATED CIRCUIT

(75) Inventor: Masao Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,103

(22) Filed: Mar. 19, 1999

(30) Foreign Application Priority Data

Sep. 8, 1998 (JP) .......................................... 10-253405

(51) Int. Cl.$^7$ ............................................. G06F 13/00
(52) U.S. Cl. ...................... 711/163; 711/152; 711/156
(58) Field of Search ................................. 711/163, 164, 711/104, 145, 152, 156, 167; 714/35, 57, 766; 710/2; 235/379, 492, 487; 365/233, 189.05, 189.01; 705/18

(56) References Cited

U.S. PATENT DOCUMENTS

| | | | |
|---|---|---|---|
| 4,758,718 A | | 7/1988 | Fujisaki et al. ............. 235/487 |
| 4,849,614 A | * | 7/1989 | Watanabe et al. ........... 235/379 |
| 5,319,765 A | * | 6/1994 | Kimura ....................... 711/164 |
| 5,343,030 A | * | 8/1994 | Sanemitsu .................. 235/492 |
| 5,442,704 A | * | 8/1995 | Holtey ....................... 711/163 |
| 5,491,827 A | * | 2/1996 | Holtey ....................... 711/163 |
| 5,517,460 A | * | 5/1996 | Yamaguchi .................. 365/233 |
| 5,644,707 A | * | 7/1997 | Chen ........................... 714/57 |
| 5,801,996 A | * | 9/1998 | Seyyedy et al. ........ 365/189.05 |
| 5,933,372 A | * | 8/1999 | Seyyedy et al. ........ 365/189.05 |
| 5,933,595 A | * | 8/1999 | Iizuka et al. .................. 714/35 |
| 6,072,328 A | * | 6/2000 | Takuma ........................... 326/8 |
| 6,112,187 A | * | 8/2000 | Fukawa ........................ 705/18 |
| 6,138,173 A | * | 10/2000 | Hisano ........................... 710/2 |
| 6,201,740 B1 | * | 3/2001 | Seyyedy et al. ........ 365/189.01 |

FOREIGN PATENT DOCUMENTS

EP    0 508 829    10/1992

* cited by examiner

*Primary Examiner*—David Hudspeth
*Assistant Examiner*—Fred F. Tzeng
(74) *Attorney, Agent, or Firm*—Arent Fox Kintner Plotkin & Kahn

(57) ABSTRACT

Plurality of latch circuits 21, 23 are provided for storing therein written data (D0~D7), and there is also a register (multiplexed latch circuit) having data bus drivers for storing the data in a specified latch circuit of the plurality of latch circuits correlated to security levels (SECU1 and SECU1 signals) for writing/reading the data to/from the latch circuits and connecting only the latch circuit correlated to a prespecified security level (SECU2 signal) of the security levels to a specified circuit (internal circuit) using the data, and outputting, when there is a request (RDS signal) to read data (D0~D7), the data stored in a storage circuit correlated to the security level of the plurality of latch circuits.

10 Claims, 14 Drawing Sheets

BLOCK DIAGRAM SHOWING GENERAL CONFIGURATION OF THE SEMICONDUCTOR INTEGRATED CIRCUIT ACCORDING TO EMBODIMENT 1

BLOCK DIAGRAM SHOWING GENERAL CONFIGURATION OF
THE SEMICONDUCTOR INTEGRATED CIRCUIT BASED ON
THE CONVENTIONAL TECHNOLOGY

FIG.2
PRIOR ART

EXPLANATORY VIEW SHOWING A PROGRAM FOR CONTROLLING
REGISTERS IN THE CONVENTIONAL TYPE OF SEMICONDUCTOR
INTEGRATED CIRCUIT

```
;; PROGRAM 1
;; VALUE "xx" IS WRITTEN TO REGISTER "reg1"

(1)  MOV    Acc, #xx   ;; VALUE "xx" IS WRITTEN TO Acc (2)  MOV    reg1, Acc  ;; DATA IN Acc IS WRITTEN TO reg1
```

FIG.3
PRIOR ART

EXPLANATORY VIEW SHOWING AN EXAMPLE OF AN UNAUTHORIZED
PROGRAM TO BE EXECUTED IN THE CONVENTIONAL TYPE OF
SEMICONDUCTOR INTEGRATED CIRCUIT

```
;; PROGRAM 2
;; VALUE "yy" IS WRITTEN TO REGISTER "reg1" AND CHECKED (1)  MOV    Acc, #yy   ;; VALUE "yy" IS WRITTEN TO Acc (2)  MOV    reg1, Acc  ;; DATA IN Acc IS WRITTEN TO reg1

(3)  MOV    Acc, reg1  ;; DATA IS READ FROM reg1 TO Acc
```

FIG.4
PRIOR ART
EXPLANATORY VIEW SHOWING AN OPERATION WHEN AN UNAUTHORIZED PROGRAM IS EXECUTED IN THE CONVENTIONAL TYPE OF SEMICONDUCTOR INTEGRATED CIRCUIT
(1) 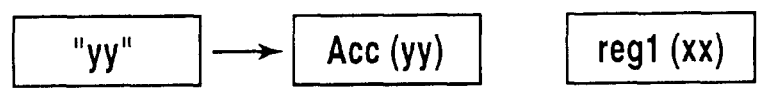
(2) 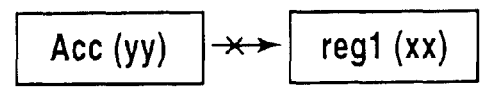
(3) 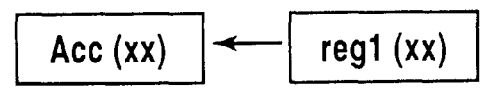

BLOCK DIAGRAM SHOWING GENERAL CONFIGURATION OF
THE SEMICONDUCTOR INTEGRATED CIRCUIT ACCORDING TO
EMBODIMENT 1

CIRCUIT DIAGRAM SHOWING CIRCUIT CONFIGURATION OF THE MULTIPLEXED LATCH CIRCUIT ACCORDING TO EMBODIMENT 1

FIG.7 CIRCUIT DIAGRAM SHOWING CIRCUIT CONFIGURATION OF THE LATCH CIRCUIT AS WELL AS OF THE DATA BUS DRIVER ACCORDING TO EMBODIMENT 1

FIG.8
EXPLANATORY VIEW SHOWING AN OPERATION WHEN AN UNAUTHORIZED PROGRAM IS EXECUTED IN THE SEMICONDUCTOR INTEGRATED CIRCUIT ACCORDING TO EMBODIMENT 1
(1) 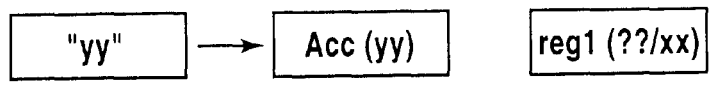
(2) 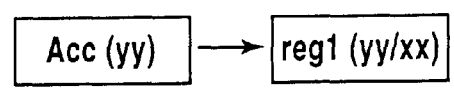
(3) 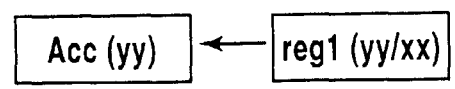

CIRCUIT DIAGRAM SHOWING CIRCUIT CONFIGURATION OF THE MULTIPLEXED LATCH CIRCUIT IN THE SEMICONDUCTOR INTEGRATED CIRCUIT ACCORDING TO EMBODIMENT 2

EXPLANATORY VIEWS SHOWING AN OPERATION OF
THE COMPARATOR ACCORDING TO EMBODIMENT 2

FIG.10A

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | O | O | O | O | O | O | O | O |
| 2 | O | O | O | O | O | O | O | O |
| 3 | O | O | O | O | O | O | O | O |
| 4 | O | O | O | O | O | O | O | O |

FIG.10B

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | — | — | — | — | — | — | — | — |
| 2 | O | O | O | O | O | O | O | O |
| 3 | — | — | — | — | — | — | — | — |
| 4 | O | O | O | O | O | O | O | O |

FIG.10C

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | O | O | — | — | O | O | — | O |
| 2 | O | O | — | — | O | O | — | O |
| 3 | O | O | — | — | O | O | — | O |
| 4 | O | O | — | — | O | O | — | O |

FIG.10D

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | O | — | O | — | — | — | — | — |
| 2 | O | — | — | O | — | O | O | O |
| 3 | O | — | — | O | — | — | O | O |
| 4 | O | — | O | O | — | O | O | — |

CIRCUIT DIAGRAM SHOWING CIRCUIT CONFIGURATION OF THE
MULTIPLEXED LATCH CIRCUIT IN THE SEMICONDUCTOR INTEGRATED
CIRCUIT ACCORDING TO EMBODIMENT 3

EXPLANATORY VIEWS SHOWING AN OPERATION OF
THE COMPARATOR ACCORDING TO EMBODIMENT 3

FIG.12A

COMPARATOR 41

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | ○ | ○ | ○ | — | — | — | — | — |
| 2 | ○ | ○ | ○ | — | — | — | — | — |
| 3 | ○ | ○ | ○ | — | — | — | — | — |

FIG.12B

COMPARATOR 42

| SECURITY LEVEL | BIT 0 | BIT 1 | BIT 2 | BIT 3 | BIT 4 | BIT 5 | BIT 6 | BIT 7 |
|---|---|---|---|---|---|---|---|---|
| 1 | — | — | — | — | — | ○ | ○ | ○ |
| 2 | — | — | — | ○ | ○ | ○ | ○ | — |
| 3 | — | — | — | ○ | ○ | ○ | ○ | ○ |

CIRCUIT DIAGRAM SHOWING CIRCUIT CONFIGURATION OF THE MULTIPLEXED LATCH CIRCUIT IN THE SEMICONDUCTOR INTEGRATED CIRCUIT ACCORDING TO EMBODIMENT 4

CIRCUIT DIAGRAM SHOWING CIRCUIT CONFIGURATION OF THE MULTIPLEXED LATCH CIRCUIT IN THE SEMICONDUCTOR INTEGRATED CIRCUIT ACCORDING TO EMBODIMENT 5

CIRCUIT DIAGRAM SHOWING CIRCUIT CONFIGURATION OF THE MULTIPLEXED CIRCUIT IN THE SEMICONDUCTOR INTEGRATED CIRCUIT ACCORDING TO EMBODIMENT 6

SEMICONDUCTOR INTEGRATED CIRCUIT

FIELD OF THE INVENTION

The present invention is related to a semiconductor integrated circuit having a security function for data protection.

BACKGROUND OF THE INVENTION

In recent years, there has been increasing demand for an IC card with a microcomputer and a nonvolatile memory mounted on a plastic card such as a credit card and a banking card which makes it possible to use electronic money or the like. FIG. 1 is a block diagram showing general configuration of a semiconductor integrated circuit based on a conventional technology in a form of an IC card or the like. The IC card generally has a magnetic stripe or an embossed area provided thereon so as to be shared as a generally used plastic card, hence size and thickness thereof are the same as those of the credit card or banking card.

Accordingly, in order to function as an IC card, a connecting terminal for performing input and output of data in and from a built-in CPU (Central Processing Unit) is located in an area other than the area where the magnetic stripe or the embossing is provided. Although this connecting terminal is standardized as eight external terminals in the ISO (International Standards Organization), two of the terminals are spare ones, and the remaining six terminals have defined functions.

In a semiconductor integrated circuit (IC card) 100 shown in FIG. 1, a connecting terminal C1 is an operation voltage supply terminal for a circuit in the card, and a connecting terminal C2 is a data-write voltage supply terminal for a memory. Connecting terminal C3 is a two-directional serial data input/output terminal, and connecting terminal C4 is an operating-clock supply terminal for a CPU 102. Connecting terminal C5 is a reset-signal supply terminal for the CPU 102, and a connecting terminal C6 is a ground terminal.

A communication interface 101 converts serial data inputted from the connecting terminal C3 to parallel data so that the converted data can be used in the CPU 102. At the manufacturing stage the IC card 100 generally stores an application program for making the card usable in a terminal for electronic money or the like (an application-provider terminal) in a ROM (Read Only Memory) 103, and the CPU 102 operates according to this application program.

The CPU 102 has a RAM (Random Access Memory) 104 for storing therein results of performing various operations on its running. Nonvolatile memory (e.g., EE-PROM, Flash memory etc.) 105 stores secret data such as information for preventing unauthorized use of the IC card, personal information of the card owner, or information depending on the application, which can be accessed from the CPU 102 through a control bus and an address bus. Input and output of data stored in the nonvolatile memory 105 in and from an external terminal (an application-provider terminal) are performed through a CPU data bus, the CPU 102 and communication interface 101. In FIG. 1, to simplify the description, three discreet IC chips mounted on the IC card are shown corresponding to the communication interface 101, CPU 102 and nonvolatile memory 105 respectively, but the communication interface 101, CPU 102 and the nonvolatile memory 105 may be integrated into one chip.

As described above, the secret data stored in the nonvolatile memory 105 is required to be protected from unauthorized access by any terminal other than the application-provider terminal. Therefore, in general, when the IC card 100 is to be used, namely when the IC card 100 is to communicate with the outside, mutual authentication is performed in the IC card 100 as well as the application-provider terminal based on an encryption algorithm such as DES (Data Encryption Standard).

This type of IC card 100 restricts one card to one function, namely to an operation according to a prespecified application program, which may have caused a number of cards to increase. In order to overcome this problem, there has been proposed a multi-application type of IC card with a plurality of application programs stored in a nonvolatile memory thereof to enable combination of various functions in one IC card.

The multi-application type of IC card is, more specifically, a card obtained by integrating functions of a banking card, a credit card, and of a prepaid card or others into a single card. Particularly, in the multi-application type of IC card, application programs can be registered therein not only during manufacture of the IC card but also when the card is issued.

Accordingly, stored in the ROM 103 is only a system program for performing basic operations such as controls for buses such as a control bus, an address bus and the CPU data bus, and controls for communications with the communication interface 101, and various types of application program are stored in the nonvolatile memory 105. When the IC card 100 is inserted in a terminal for using applications, the CPU 102 realizes a specified operation by directly executing a corresponding application program in the nonvolatile memory 105, or by reading a corresponding application program from the nonvolatile memory 105 in the RAM 104 and executing the read-in application program.

However, the multi-application type of IC card as described above is characterized in that various application programs can be registered therein for execution, but it is also possible, for example, to read an unauthorized program used for the purpose of illegally reading out or tampering with data used in other registered application programs into the IC card with an ill will to make the program execute.

Description is made hereinafter for an operation according to an unauthorized program. FIG. 2 is an explanatory view showing a program for controlling registers in the conventional type of semiconductor integrated circuit. This program comprises instructions for controlling registers in the system program stored in the ROM 103. As shown in FIG. 2, the CPU 102 generally has some registers for processing operations inside thereof, and performs data processing stored in the RAM 104 and nonvolatile memory 105 through these registers.

In Program 1 shown in FIG. 2, at first, a value "xx" is written to Acc (accumulator) as one of the registers according to a MOV instruction. Then, the value stored in Acc, namely "xx" is written to reg 1 (register) according to the same MOV instruction.

Although the program stored in the ROM 103 can not directly be tampered with as described above, however in the multi-application type of IC card an application program is read in the RAM 104 and the program can be executed on the RAM 104, therefore, there may be a case where the program on the ROM 103 as shown in FIG. 2 can easily be replicated onto the RAM 104.

FIG. 3 is an explanatory view showing an example of an unauthorized program which can be executed in the conventional type of semiconductor integrated circuit. This program is so configured that the program for controlling registers shown in FIG. 2 is replicated and an instruction for confirming data write is added to the replicated program. In Program 2 shown in FIG. 3, at first, a value "yy" is written to the Acc for the purpose of tampering with the program according to the MOV instruction in place of the value "xx" originally written thereinto.

The value stored in Acc, namely "yy" is written to the reg 1 according to the same MOV instruction. Then, the value stored in the reg 1 is read in again in the Acc according to the MOV instruction, and a result of tampering can be checked by referring to this Acc.

By the way, when the Program 2 is executed and if the reg 1 is write-protected in the system program in the ROM 103 or the application program registered in the nonvolatile memory 105, the instruction of Line (2) in the FIG. 3 is not accurately executed. FIG. 4 is an explanatory view showing an operation when an unauthorized program is executed in the conventional type of semiconductor integrated circuit, and shows an operation when the write-protected reg 1 (register) executes Program 2 shown in FIG. 3.

In Line (1) in FIG. 4, at first, the value "yy" is written to the Acc (Acc (yy)). Then, in Line (2), the instruction to write the value, namely "yy" stored in the Acc into register 1 is executed. However, the reg 1 is write-protected, and actually, the data in the reg 1 i.e. the value "xx" is unchanged.

In Line (3) following the above lines, the data stored in reg 1 is read in the Acc and a result of tampering is checked. The unauthorized person having executed the illegal program notices that the value "yy" has not been written to the reg 1 and comes to know that the reg 1 is write-protected.

The write-protected data is generally secret data, and the unauthorized person comes to know that the data in reg 1 is a secret data. After knowing this, the unauthorized person can obtain hints or develop ideas to create and sophisticate an unauthorized program for tampering with the secret data by finding the cause in a case where the program for the purpose of tampering does not work as intended, and this may increase the probability of more or bigger fraud.

SUMMARY OF THE INVENTION

The present invention has been made in the light of the circumstances as described above, and it is an object of the present invention to provide a semiconductor integrated circuit having a security function to prevent data from being tampered with as well as to make it difficult to get any hints to create and sophisticate an unauthorized program for tampering with data.

With this invention, only data in a prespecified security level can be outputted to a specified circuit for using the data, and data in security levels other than the level can be prevented from its being outputted to the specified circuit even if writing is executed to the data.

According to one feature of the present invention, by outputting data stored in a storage circuit correlated to a security level, it is possible to give the operator an impression that writing of data to a specified circuit had been performed.

According to one feature of the present invention, an operation stop signal is outputted when the counting of data-inconsistency reaches a prespecified number, which allows a function of stopping an operation to be realized.

According to one feature of the present invention, bits of data to be compared are changed for each storage circuit and only the changed bits are compared to each other, so that there is no need to compare all the bits, which allows data to be compared with higher speed.

According to one feature of the present invention, by storing the same data as that stored in the storage circuit correlated to a prespecified security level in a storage circuit other than the storage circuit, it is possible to give the operator an impression that data to be written actually used in a specified circuit has been written.

According to one feature of the present invention, only a portion of data to be written in a specified circuit is stored in a specified storage circuit of the register, so that it is possible to make the capacity of the storage circuit smaller and also perform the processing of writing/reading data in/from the register at a high speed.

According to one feature of the. present invention, a storage circuit is realized with a latch circuit, so that it is possible to perform writing/reading of data at a high speed.

According to one feature of the present invention, a storage circuit is realized with a RAM or a FRAM, so that a register can be downsized.

Other objects and features of this invention will become understood from the following description with reference to the accompanying drawings.

BRIEF DESCRIPTION OF THE DRAWINGS

FIG. 2 is an explanatory view showing a program for controlling registers in the conventional type of semiconductor integrated circuit.

FIG. 3 is an explanatory view showing an example of an unauthorized program to be executed in the conventional type of semiconductor integrated circuit.

FIG. 4 is an explanatory view showing an operation when an unauthorized program is executed in the conventional type of semiconductor integrated circuit.

FIG. 8 is an explanatory view showing an operation when an unauthorized program is executed in the semiconductor integrated circuit according to Embodiment 1.

FIG. 10A to FIG. 10D are explanatory views showing an operation of the comparator according to Embodiment 2.

FIG. 12A and FIG. 12B are explanatory views showing an operation of the comparator according to Embodiment 3.

DESCRIPTION OF THE PREFERRED EMBODIMENTS

Detailed description is made hereinafter for the semiconductor integrated circuit according to the present invention with reference to the related drawings. It should be noted that, the present invention is not limited by these embodiments.

Figure 5:
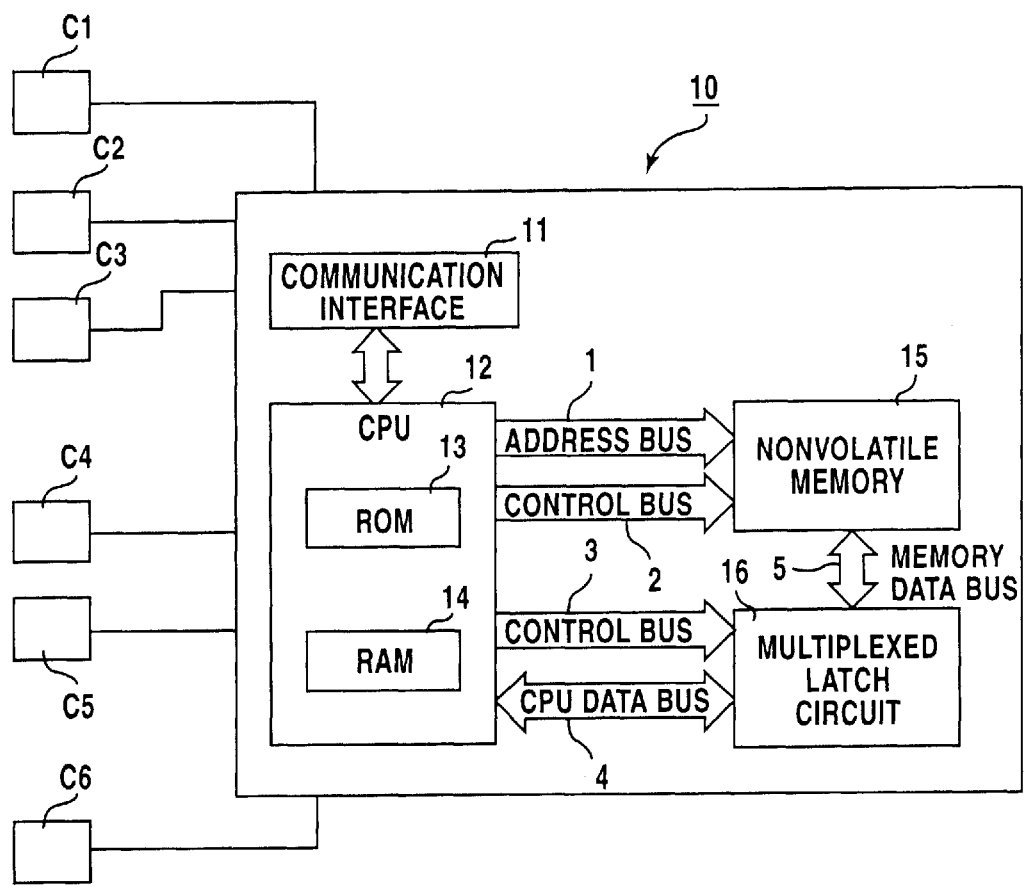
FIG. 5 is a block diagram showing general configuration of the semiconductor integrated circuit according to Embodiment

FIG. 5 is a block diagram showing general configuration of a semiconductor integrated circuit according to Embodiment 1. FIG. 5 shows especially a semiconductor integrated circuit 10 in a form of an IC card. In FIG. 5, the semiconductor integrated circuit 10 (IC card) comprises six connecting terminals C1 to C6, a communication interface 11, a CPU 12, a nonvolatile memory 15 and a multiplexed latch circuit 16.

Figure 1:
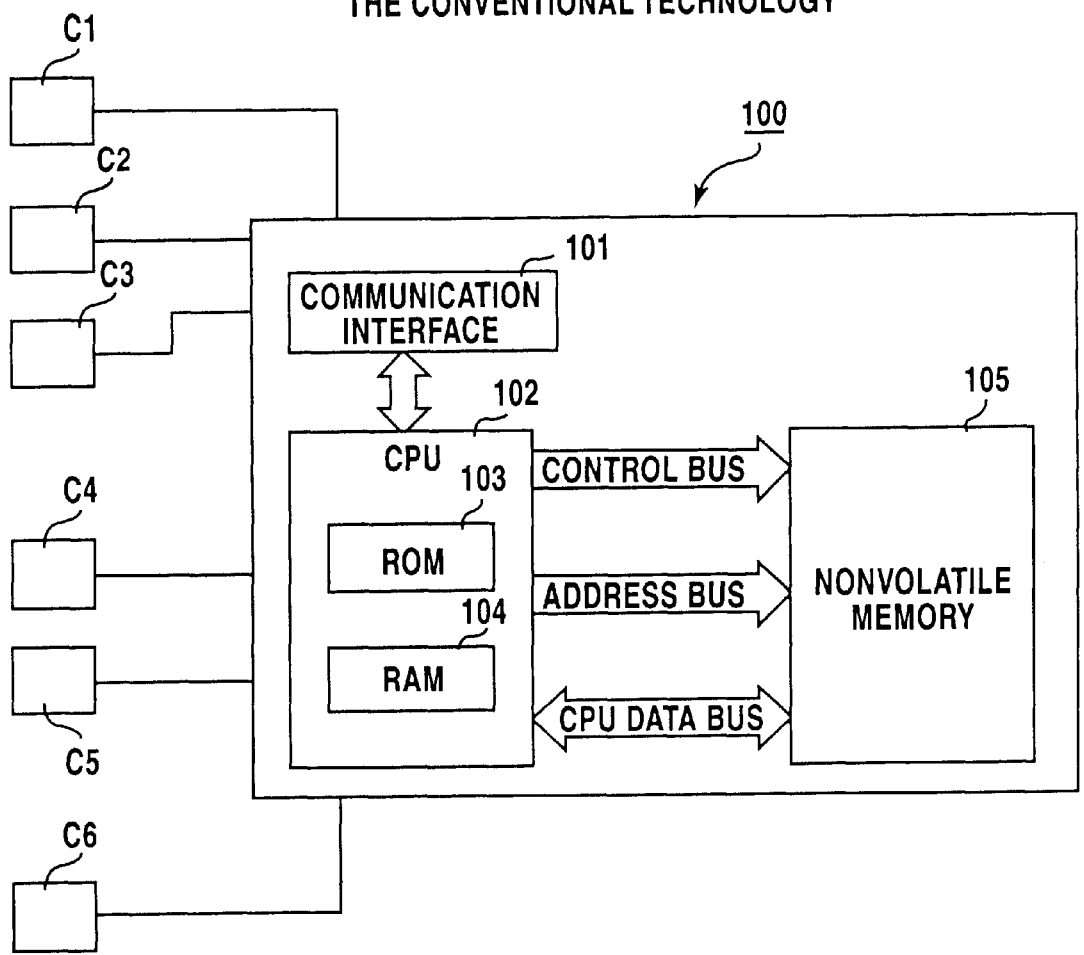
FIG. 1 is a block diagram showing general configuration of the semiconductor integrated circuit based on the conventional technology.

The connecting terminals C1 to C6 and communication interface 11 are as described in FIG. 1, so that description thereof is omitted herein. The IC card 10 is different from the IC card 100 shown in FIG. 1 in the point that the multiplexed latch circuit 16 (register) is newly provided therein. The CPU 12 realizes its operation by directly executing an application program stored in the nonvolatile memory (e.g., an EE-PROM, a Flash memory and FRAM etc.) 15, or by reading an application program in the RAM 14 once from the nonvolatile memory 15 and then executing this application program. However, input and output of data between the CPU 12 and nonvolatile memory 15 are performed according to a system program stored in the ROM 13 through the multiplexed latch circuit 16.

The multiplexed latch circuit 16 has a prespecified number of temporary storage circuits (latches, not shown in the figure), the quantify of which is equivalent to a number of prespecified security levels, each correlated to one of the security levels. These temporary storage circuits are activated in correlation to each security level shown by a security signal inputted into the multiplexed latch circuit 16 respectively. For example, when a security signal shown by a security level 3 is inputted into the multiplexed latch circuit 16, the temporary storage circuit correlated to the security level 3 is activated.

For example, when a data write instruction is issued from the CPU 12, specifically, from the application program, the write instruction is inputted into the multiplexed latch circuit 16 as a write signal through the control bus 3. At this point of time, the CPU 12 outputs data as an object for writing onto the CPU data bus 4.

In addition the write signal is inputted into the nonvolatile memory 15 through the control bus 2. Further, an address signal indicating an address of a target to be written in is inputted into the nonvolatile memory 15 through the address bus 1.

Herein the CPU 12 inputs, in addition to the write signal, a security signal in a security level decided for a register used by an application program for its operation into the multiplexed latch circuit 16.

Then, the multiplexed latch circuit 16 activates a temporary storage circuit correlated to the security level indicated by the received security signal and inputs the data on the CPU data bus 4 into the activated temporary storage circuit to store the data therein.

On the other hand, when a data read instruction is issued from the CPU 12, to be precise from the application program, the read instruction is inputted into the multiplexed latch circuit 16 as a read signal through the control bus 3.

This read signal is also inputted into the nonvolatile memory 15 through the control bus 2. Further, a address signal indicating an address of a target to be read is inputted into the nonvolatile memory 15 through the address bus 1.

Herein the CPU 12 inputs, in addition to the read signal, the security signal described above into the multiplexed latch circuit 16. Then, the multiplexed latch circuit 16 activates a temporary storage circuit correlated to the security level indicated by the received security signal and outputs data from the activated temporary storage circuit onto the CPU data bus 4.

Data input and output into and from an internal circuit (a specified circuit) in the nonvolatile memory 15 or the like are possible only in the temporary storage circuit correlated to the highest security level in response to the write/read instructions as described above. Description is made hereinafter for data write/read operation when the security signal shows the highest security level.

At first, in the data write operation, the CPU 12 inputs a write signal indicating a write instruction into the nonvolatile memory 15 through the control bus 2 as well as into the multiplexed latch circuit 16 through the control bus 3. At the same time, the CPU 12 inputs an address signal indicating a target of data to be written in into the nonvolatile memory 15 through the address bus 1 and outputs the data as an object to be written in onto the CPU data bus 4. The multiplexed latch circuit 16 inputs the data on the CPU data bus 4 into the temporary storage circuit correlated to the highest security level to temporarily store the data therein.

The temporary storage circuit correlated to the highest security level is connected to a memory data bus 5, and data stored once in the temporary storage circuit is outputted onto the memory data bus 5. The nonvolatile memory 15 captures the data on the memory data bus 5 and transfers the captures data to storage indicated by the address signal to store it therein.

On the other hand, in the data read operation, the CPU 12 inputs a read signal indicating a read instruction into the nonvolatile memory 15 through the control bus 2 as well as into the multiplexed latch circuit 16 through the control bus 3. At the same time, the CPU 12 inputs an address signal indicating a target of data to be read into the nonvolatile memory 15 through the address bus 1. The nonvolatile memory 15 fetches data from the storage indicated by the address signal and outputs the fetched data onto the memory data bus 5.

The CPU 12 reads out the data on the memory data bus 5 through the CPU data bus 4 as well as through the temporary storage circuit correlated to the highest security level.

Figure 6:
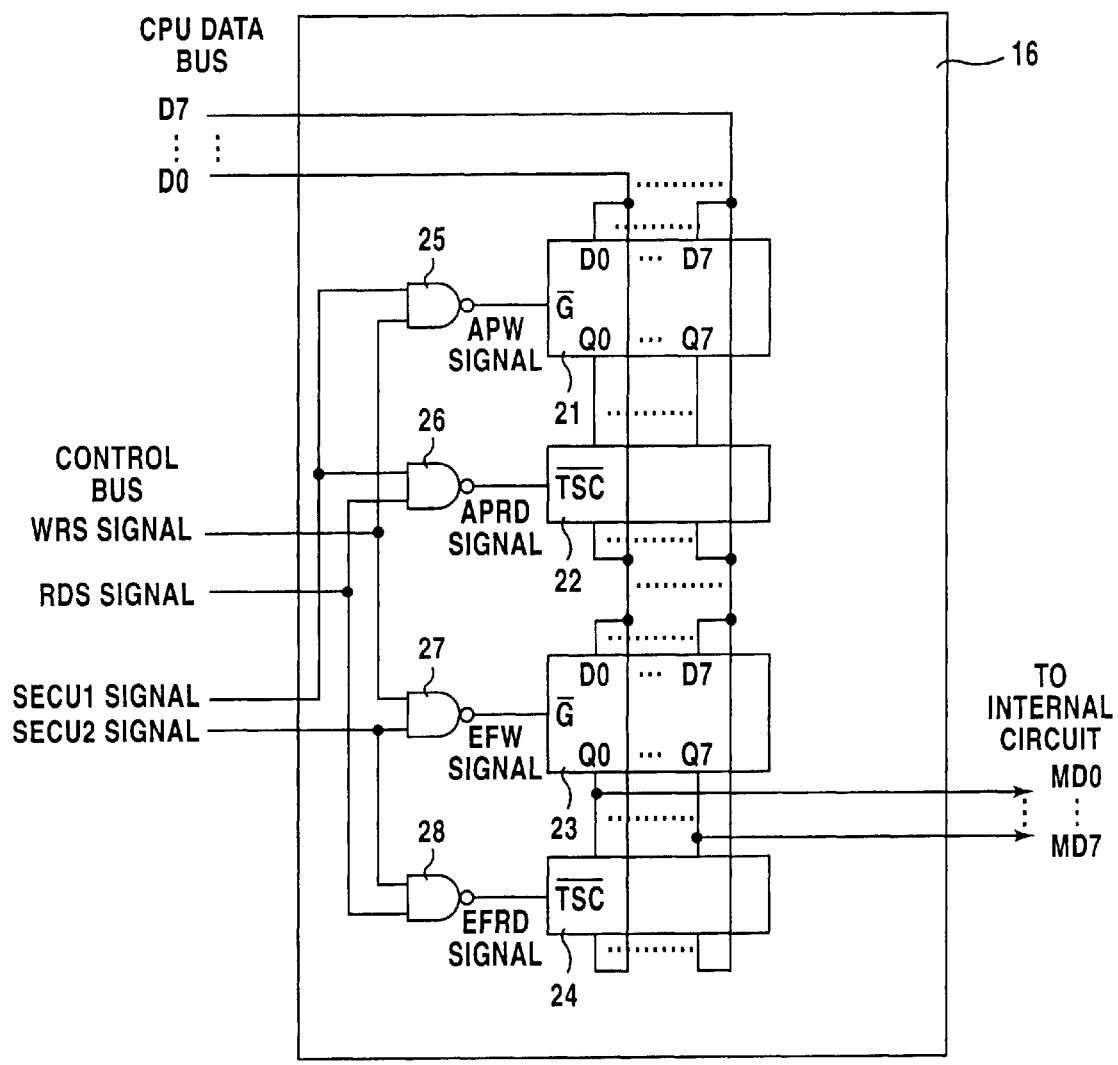
FIG. 6 is a circuit diagram showing circuit configuration of the multiplexed latch circuit according to Embodiment 1.

Next, description is made for circuit configuration of the multiplexed latch circuit 16. FIG. 6 is a circuit diagram showing circuit configuration of the multiplexed latch circuit according to Embodiment 1. In FIG. 6, WRS and RDS signals correspond to the write and read signals described above respectively. The multiplexed latch circuit 16 shown in FIG. 6 has temporary storage circuits correlated to two security levels 1 and 2 respectively, and SECU1 and SECU2 signals are security signals corresponding to the security levels 1 and 2 respectively.

Each of the temporary storage circuits comprises a latch circuit (storage circuit) for receiving data on the CPU data bus 4 and a data bus driver (output circuit) for reading out the data stored in the latch circuit and outputting the read data onto the CPU data bus 4. In FIG. 6, inputs of a latch circuit 21 correlated to the security level 1 and inputs of a latch circuit 23 correlated to the security level 2 are connected to the CPU data bus 4, into which data D0 to D7 are inputted.

Outputs of a data bus driver 22 correlated to the security level 1 and outputs of a data bus driver 24 correlated to the security level 2 are connected to the CPU data bus 4, from which data stored in the latch circuits 21 and 23 respectively are outputted onto the CPU data bus 4 as data D0 to D7. It should be noted that, the latch circuits 21 and 23, and the data bus drivers 22 and 24 are activated each by receiving a signal of "L" level in each enable terminal thereof respectively.

The multiplexed latch circuit 16 has four NAND gates 25 to 28. The output of the NAND gate 25 is connected to the enable terminal of the latch circuit 21, receives a SECU1 signal from one of input terminals, and receives a WRS signal from the other input terminal. Accordingly, the NAND gate 25 outputs a signal indicating "L" level as an APW signal on condition that both the SECU1 signal and the WRS signal show "H" level, and activates the latch circuit 21, namely can make the latch circuit 21 latch the data D0 to D7 on the CPU data bus 4 and store the data therein.

The output of the NAND gate 26 is connected to the enable terminal of the data bus driver 22, receives a SECU1 signal from one of input terminals, and receives a RDS signal from the other input terminal. Accordingly, the NAND gate 26 outputs a signal indicating "L" level as an APRD signal on condition that both the SECU1 signal and the RDS signal show "H" level, and activates the data bus driver 22, namely can make the data bus driver 22 output the data stored in the latch circuit 21 onto the CPU data bus 4.

The output of the NAND gate 27 is connected to the enable terminal of the latch circuit 23, receives a SECU2 signal from one of input terminals, and receives a WRS signal from the other input terminal. Accordingly, the NAND gate 27 outputs a signal indicating "L" level as an EFW signal on condition that both the SECU2 signal and the WRS signal show "H" level, and activates the latch circuit 23, namely can make the latch circuit 23 latch the data D0 to D7 on the CPU data bus 4 and store the data therein.

The output of the NAND gate 28 is connected to the enable terminal of the data bus driver 24, receives a SECU2 signal from one of input terminals, and receives a RDS signal from the other input terminal. Accordingly, the NAND gate 28 outputs a signal indicating "L" level as an EFRD signal on condition that both the SECU2 signal and the RDS signal show "H" level, and activates the data bus driver 24, namely can make the data bus driver 24 output the data stored in the latch circuit 23 onto the CPU data bus 4.

Further, outputs Q0 to Q7 of the latch circuit 23 and inputs of the data bus driver 24 each correlated to the security level 2 as the highest security level are connected to the internal circuit such as the nonvolatile memory 15. Accordingly, the data stored in the latch circuit 23 can be outputted as data MD0 to MD7 to the internal circuit.

Thus, the multiplexed latch circuit 16 can establish connection, as far as a security level signal indicating the highest security level is received as "H" level, with the CPU data bus 4 through the latch circuit 23 or the data bus driver 24 each correlated to the highest security level, and also allows an access to the internal circuit.

Figure 7:
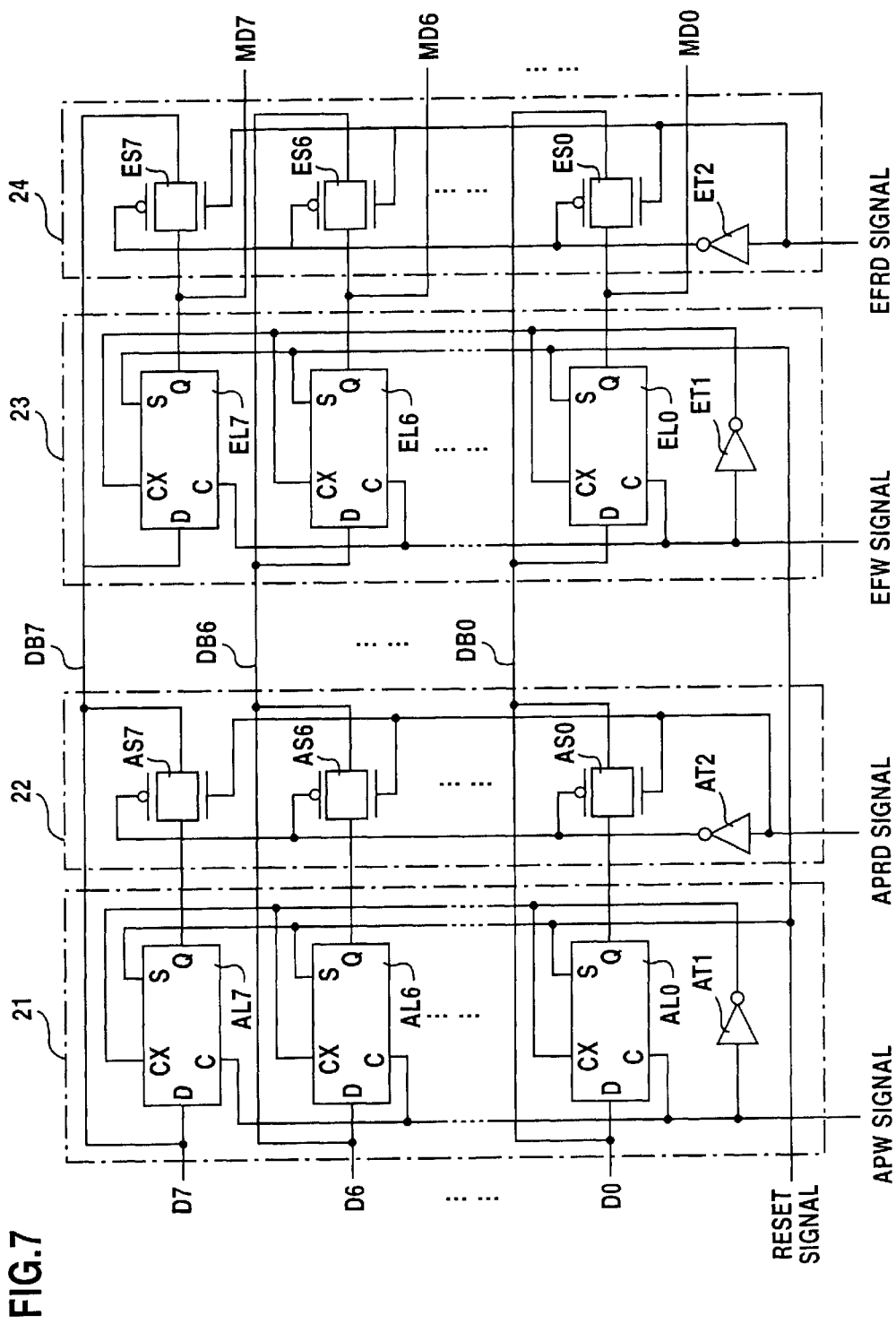
FIG. 7 is a circuit diagram showing circuit configuration of the latch circuit as well as of the data bus driver according to Embodiment 1.

FIG. 7 is a circuit diagram showing circuit configuration of the latch circuit as well as of the data bus driver according to Embodiment 1. In FIG. 7, the latch circuit 21 has D latches AL0 to AL7 each for receiving corresponding bits of data D0 to D7 in each data input terminal D thereof to latch the bits respectively. Each D latch of the latch circuit 21 receives an APW signal in a latch enable terminal C, receives an inverted signal of the APW signal in a latch enable inverse terminal CX through an inverter AT1, and latches bit data inputted in each data input terminal D when the APW signal indicates "H" level. Also each D latch of the latch circuit 21 has a data output terminal Q connected to the data bus driver 22.

The data bus driver 22 has transfer gates AS0 to AS7 each for reading latched bit data from each data output terminal Q of the D latches AL0 to AL7 in the latch circuit 21 and outputting the read bit data onto the CPU data bus 4.

One of contact terminals in each of the transfer gates AS0 to AS7 is correlated to each data output terminal Q of the D latches AL0 to AL7 in the latch circuit 21 respectively, so that each connection between two terminals is made as follows: the data output terminal Q of the D latch AL7 and one of contact terminals of the transfer gate AS7, the data output terminal Q of the D latch AL6 and one of contact terminals of the transfer gate AS6, . . . the data output terminal Q of the D latch AL0 and one of contact terminals of the transfer gate AS0.

Other contact terminal of each of the transfer gates AS0 to AS7 is correlated to each of the data buses DB0 to DB7 each connected to the CPU data bus 4, so that each connection between the terminal and bus is made as follows: the other contact terminal of the transfer gate AS7 and the data bus DB7, the other contact terminal of the transfer gate AS6 and the data bus DB6, . . . the other contact terminal of the transfer gate AS0 and the data bus DB0.

Each of the transfer gates receives an APRD signal in one of control terminals, and receives an inverted signal of the APRD signal in the other control terminal through an inverter AT2. Accordingly, when the APRD signal indicates "H" level, ON state of each transfer gate is effected, and data latched by the D latches AL0 to AL7 is outputted onto the data buses DB0 to DB7. For example, when the output from the D latch AL7 indicates "H" level, a signal indicating "H" level is outputted onto the data bus DB7.

Thus, the latch circuit 21 latches, when the APW signal as a write signal for the security level 1 indicates "H" level, data D0 to D7 on the CPU data bus 4 by the D latches, and the data bus driver 22 outputs, when the APRD signal as a read signal for the security level 1 indicates "H" level, the data having been latched by D latches as data D0 to D7 onto the CPU data bus 4. Accordingly, the CPU 12 performs, for access to the address set to the security level 1, input and output of data into and from only the multiplexed latch circuit 16 and does not make an access to the internal circuit.

The latch circuit 23 correlated to the security level 2 has the same configuration as that of the latch circuit 21, and has D latches EL0 to EL7 and an inverter ET1. In the latch circuit 23, an EFW signal is inputted in each of the D latches, and when the EFW indicates "H" level, bit data inputted in each of data input terminals D is latched.

The data bus driver 24 has also the same configuration as that of the data bus driver 22, and has transfer gates ES0 to ES7 and an inverter ET2. In the data bus driver 24, an EFRD signal is inputted in each of the transfer gates, and when the EFRD signal indicates "H" level, the data having been latched by each of the D latches is outputted onto the data bus DB0 to DB7.

Herein, each output terminal of the D latches in the latch circuit 23 and one of input terminals of each transfer gate in the data bus driver 24 are connected to the memory data bus 5. Accordingly, for example, output from the D latch EL7 can be sent out to the internal circuit as data MD7, and also outputted onto the CPU data bus 4 through the transfer gate ES7.

Thus, the latch circuit 23 latches, when the EFW signal as a write signal for the highest security level 2 indicates "H" level, data D0 to D7 on the CPU data bus 4 by the D latches, and at the same time outputs the latched data D0 to D7 to the internal circuit as data MD0 to MD7.

The data bus driver 24 outputs, when the EFRD signal as a read signal for the highest security level 2 indicates "H" level, the data having been latched by D latches as data D0 to D7 onto the CPU data bus 4. Accordingly, the CPU 12 performs, for access to the address set to the security level 2, input and output of data into and from the multiplexed latch circuit 16 and also allows access to the internal circuit.

In FIG. 7 a RESET signal for resetting each of the D latches in the latch circuit 21 as well as in the latch circuit 23 is shown, and this RESET signal is outputted from the CPU 12 through the control bus 3.

FIG. 8 is an explanatory view showing an operation when an unauthorized program is executed in the semiconductor integrated circuit according to Embodiment 1, and shows a result of the case where the unauthorized program is executed to the register control shown in FIG. 3 described above. At first, in Line (1) in FIG. 8, the value "yy" is written to the Acc. Then, in Line (2), an instruction for writing the value stored in the Acc, namely for writing "yy" to the reg 1 is executed.

Herein, if the program is an authorized one, a security signal indicating the highest security level for the reg 1 should be inputted in the multiplexed latch circuit 16, but according to the unauthorized program shown in FIG. 3, the program is always operated in the lowest security level, therefore, a security signal indicating the lowest security level is outputted, while a security signal indicating the highest security level is not outputted.

Accordingly, the instruction shown in Line (2) of FIG. 8 is inputted in a latch circuit correlated to the lowest security level in the multiplexed latch circuit 16, and access to the internal circuit is not made. At this stage, the secret data stored in the internal circuit can be protected. However, in Line (3), the target for reading out the data in the reg 1 to the Acc is the latch circuit inside the multiplexed latch circuit 16, so that the value "yy" having been written in Line (2) is read into the Acc. With the operation, the unauthorized person confirms the fact that tampering with data has been effected by the executed unauthorized program, and will not know that the reg 1 has been given the security such as write-protect.

Even if the unauthorized person notices that a result of the illegal program is not reflected, the data in the register as an object for tampering looks as if the data is rewritten by the unauthorized program at a glance, and hence problems in the result can not be specified, and an attempt to give ill effect on the semiconductor integrated circuit will face difficulty.

It should be noted that, a number of security levels is two in Embodiment 1, but more than two levels may be employed, and in that case, it is required to have temporary storage circuits each comprising latch circuits and data bus drivers in correlation to security levels respectively.

As described above, with the semiconductor integrated circuit according to Embodiment 1, there are provided a specified number of pairs each comprising latch circuits for receiving data from the CPU 12 according to a write instruction as well as to a security level signal each from the CPU 12 and storing the data therein, and the data bus drivers 22 and 24 for outputting the data stored in the latch circuits 21 and 23 to the CPU 12 according to a read signal as well as to the security level signal from the CPU 12, the specified number equivalent to a number of security levels, and only the data stored in the latch circuit 23 correlated to the highest security level is outputted to the internal circuit (specified circuit), so that access to the internal circuit can not be made unless the application program executed in the CPU 12 outputs the security signal indicating the highest security level, thus, data input and output are performed by using only the latch circuit 21 in the multiplexed latch circuit 16, which allows secret data in the internal circuit to be protected from an unauthorized program with no output instruction of a security signal therein.

Also, an impression that tampering by the illegal program has apparently been successful can be given to an unauthorized person, which makes it difficult to handle tampering by using a more sophisticated illegal program by the unauthorized person.

Next, description is made for a semiconductor integrated circuit according to Embodiment 2. The semiconductor integrated circuit according to Embodiment 2 has different circuit configuration in the multiplexed latch circuit of the semiconductor integrated circuit according to Embodiment 1. Therefore, description is made herein for a multiplexed latch circuit.

Figure 9:
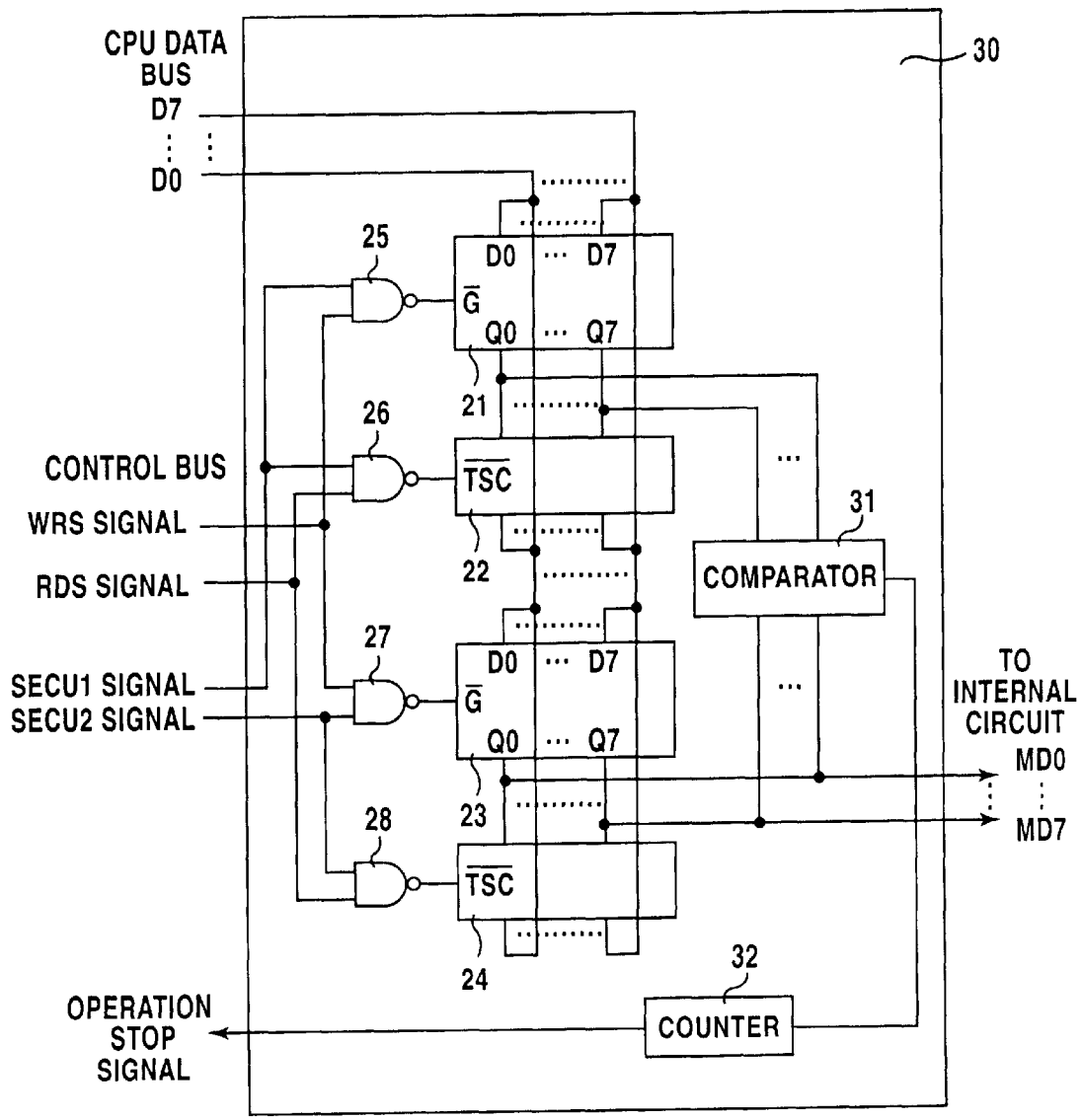
FIG. 9 is a circuit diagram showing circuit configuration of the multiplexed latch circuit in the semiconductor integrated circuit according to Embodiment 2.

FIG. 9 is a circuit diagram showing circuit configuration of the multiplexed latch circuit in the semiconductor integrated circuit according to Embodiment 2. In FIG. 9, the multiplexed latch circuit 30 has a comparator 31 and a counter 32 especially added to the multiplexed latch circuit 16 shown in Embodiment 1. Each configuration and operation of the other components such as the latch circuits 21 and 23, the data bus drivers 22 and 24, and the NAND gates 25 to 28 are as described in Embodiment 1, so that description thereof is omitted herein.

In FIG. 9, the comparator 31 is connected to output of the latch circuit 21 correlated to the lowest security level and connected to the memory data bus for output of the latch circuit 23 correlated to the highest security level, and compares data stored in the latch circuit 21 to data on the memory data bus 5.

Herein, when a semiconductor integrated circuit in a form of an IC card or the like is to be used, operations are generally so performed that entry of an authentication code is requested from the application-provider terminal and the user inputs the authentication code through an input device which accompanies a terminal with the semiconductor integrated circuit mounted thereon. In this case, the application program executed on the semiconductor integrated circuit according to Embodiment 2 inputs, for example, a security signal indicating the lowest security level 1, a write signal (WRS signal), and data D0 to D7 indicating authentication code entered by the user into the multiplexed latch circuit 30. At this point of time, the data D0 to D7 indicating authentication code is inputted into the latch circuit 21 correlated to the security level 1 in the multiplexed latch circuit 30.

On the other hand, the application program activates the data bus driver 24 and outputs data indicating a valid identification code having previously been stored in the latch circuit 23.

Then, the comparator 31 compares the output from the latch circuit 21, namely the data indicating the authentication code entered by the user to the data indicating the valid authentication code, and outputs a inconsistency signal when the data are not identical to each other. Herein, the inconsistency signal is inputted into the counter 32.

The counter 32 counts a number of occurrences of inconsistency signal as described above. Then, when the number of times counted in the counter 32 reaches a prespecified number of times, the counter outputs an operation stop signal to the CPU 12. The CPU 12 executes, when receiving this operation stop signal, an operation stop function which does not let the operator notice that the rewrite has been failed.

Next, description is made for an operation of the multiplexed latch circuit 30 when the unauthorized program as shown in Embodiment 1 as an application program is executed in the CPU 12. Herein, a case where the unauthorized program tampers with secret data preset in the highest security level in the internal circuit is considered.

At first, in the unauthorized program, a rewrite instruction of the secret data with new data is issued. Herein, if the program is an authorized one, a security signal indicating the highest security level should be inputted in the multiplexed latch circuit 30, but according to the unauthorized program, the program is always operated in the lowest security level, and hence a security signal indicating the lowest security level is outputted, while a security signal indicating the highest security level is not outputted.

Accordingly, the new data outputted from the unauthorized program onto the CPU data bus 4 is stored in the latch circuit 21 correlated to the lowest security level by a write signal inputted in the multiplexed latch circuit 30.

After storage of the new data is completed, the CPU 12 inputs a lowest security level signal (SECU1) and a highest security level signal (SECU2) into the multiplexed latch circuit 30. Hence, the new data stored in the latch circuit 21 and the secret data stored in the latch circuit 23 are inputted into the comparator 31.

In this case, the number counted in the counter 32 corresponds to the number of times an unauthorized access to the secret data has been made by the unauthorized program as described above.

It should be noted that, in the description of Embodiment 2 as described above, the comparator 31 may perform comparison for all the data, or may perform comparison of only a portion of data bits constituting the data. Especially, when a number of set security levels is three or more, a number of data bits to be compared to the data on the memory data bus can be changed for each security level other than the highest level.

FIG. 10A to FIG. 10D are explanatory views showing an operation of the comparator according to Embodiment 2, and shows an example of comparison between data when four security levels are set. FIG. 10A shows that all the data bits between each latch circuits correlated to all the security levels 1 to 4 are compared. It should be noted that, the security level 1 shows the lowest security level and the security level 4 shows the highest security level.

FIG. 10B shows that, when the latch circuit correlated to the security level 2 is selected as a latch circuit to be compared, all data bits on data for the latch circuit correlated to the highest security level 4 are compared to all data bits on data for the latch circuit correlated to the security level 2.

FIG. 10C shows that comparison is made for data bits 0, 1, 4, 5, 7 on data between the latch circuits correlated to each of all the security levels 1 to 4.

FIG. 10D shows that, for data in latch circuits, comparison is made for data bit 0 among the latch circuits correlated to each of all the security level 1 to 4, and for data bit 2, comparison is made between the latch circuits correlated to the security level 1 and security level 4 respectively. Further, for data bits 3 and 6, comparison is made between the latch circuits correlated to the security levels 2 to 4 respectively, comparison is made between the latch circuits correlated to the security level 2 and security level 4 respectively for data bit 5, and comparison is made between the latch circuits correlated to the security level 2 and security level 3 respectively for data bit 7.

As described above, with the semiconductor integrated circuit according to Embodiment 2, the multiplexed latch circuit 16 of the semiconductor integrated circuit according to Embodiment 1 further comprises the comparator 31 for comparing data for the latch circuit 21 correlated to any security level other than the highest level to data for the latch circuit 21 correlated to the highest security level and outputting a inconsistency signal when it is decided that both data are inconsistent to each other; and the counter 32 for outputting an error signal when counting a number of occurrences of the inconsistency signal reaches the prespecified number, so that, in addition to the effect by the semiconductor integrated circuit according to Embodiment 1, it is possible to prevent unauthorized access to the semiconductor integrated circuit and also prevent tampering with secret data used in an internal circuit.

Next, description is made for a semiconductor integrated circuit according to Embodiment 3. The semiconductor integrated circuit according to Embodiment 3 has different circuit configuration in the multiplexed latch circuit of the semiconductor integrated circuit according to Embodiment 2. Therefore, description is made herein for a multiplexed latch circuit.

Figure 11:
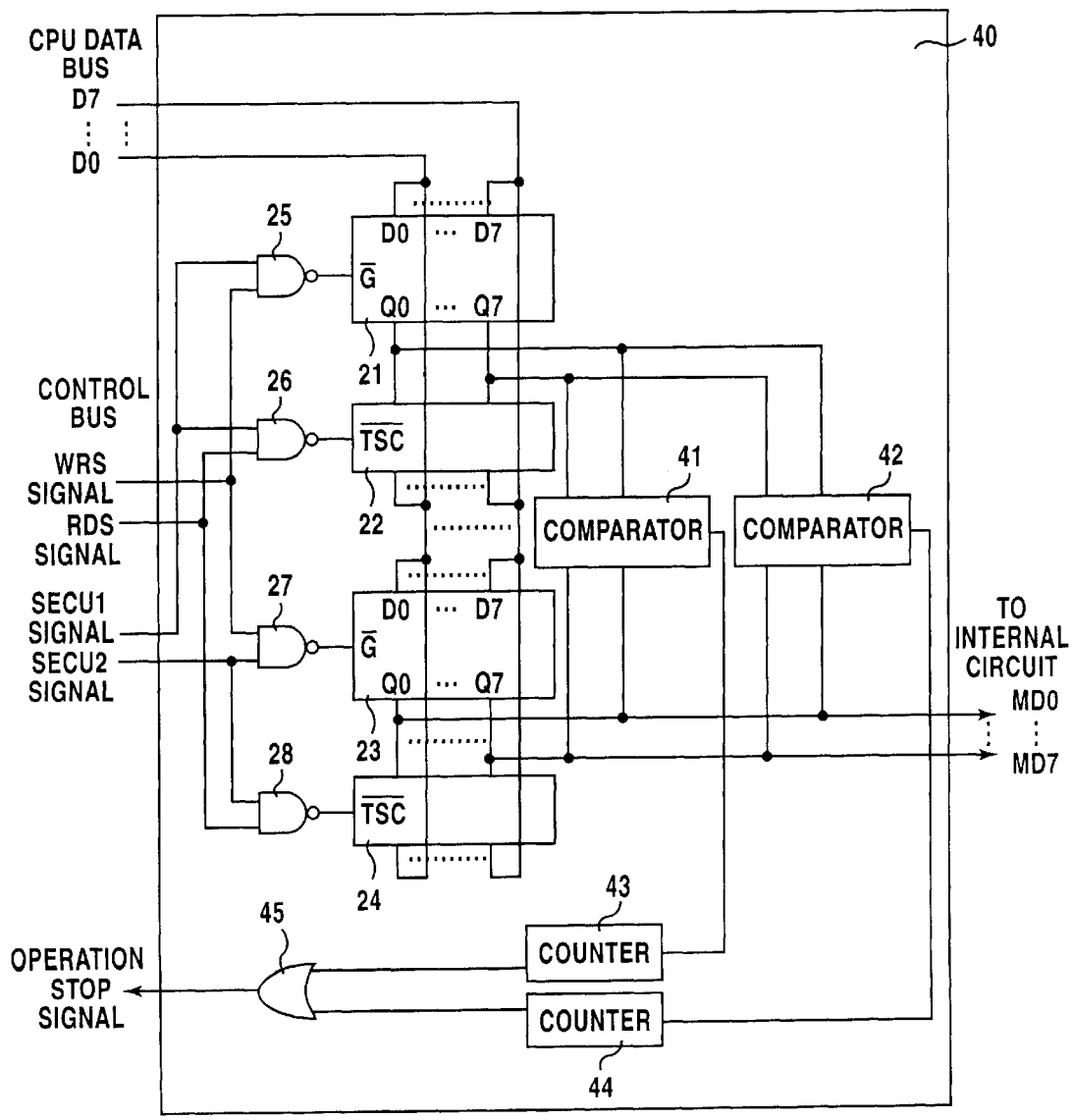
FIG. 11 is a circuit diagram showing circuit configuration of the multiplexed latch circuit in the semiconductor integrated circuit according to Embodiment 3.

FIG. 11 is a circuit diagram showing circuit configuration of the multiplexed latch circuit 40 in the semiconductor integrated circuit according to Embodiment 3. In FIG. 11, the multiplexed latch circuit 40 has comparators and counters especially added to the multiplexed latch circuit 30 shown in Embodiment 2, in which output from each counter is inputted into an OR gate and output from the OR gate works as an operation stop signal. Configuration and operation of the latch circuits 21 and 23, the data bus drivers 22 and 24, and the NAND gates 25 to 28 are as described in Embodiment 1, so that description thereof is omitted herein.

In FIG. 11, the comparator 41 and comparator 42 are connected to outputs from the latch circuit 21 as well as to outputs from the latch circuit 23, and each of them compares data stored in the latch circuit 21 to data stored in the latch circuit 23.

Each of the comparator 41 and comparator 42 outputs, when it is shown that compared data is inconsistent to each other, a inconsistency signal indicating "H" level respectively. The inconsistency signal outputted from the comparator 41 is inputted into the counter 43, while the inconsistency signal outputted from the comparator 42 is inputted into the counter 44.

The counter 43 counts a number of occurrences of a inconsistency signal inputted from the comparator 41, and inputs, when a result of counting reaches a prespecified number of times, a signal indicating "H" level into one of input terminals of the OR gate 45. The counter 44 also counts a number of occurrences of a inconsistency signal inputted from the comparator 42, and inputs, when a result of counting reaches a prespecified number of times, a signal indicating "H" level into the other input terminal of the OR gate 45. The OR gate 45 inputs, when the result of counting reaches the prespecified number of times in either of the counters 43 and 44, a signal indicating "H" level, in other words the operation stop signal described above into the CPU 12.

Herein, the comparators 41 and 42 are characterized in that numbers and structures of data bits as each object for comparison are different from each other. For example, in the comparator 41 comparison can be made for higher order 4 bits of 8-bit data, and in the comparator 42 comparison can be made for lower order 4 bits of 8-bit data.

It should be noted that, in the description of Embodiment 3, especially, when a number of set security levels is three or more, a number of data bits to be compared to the data on the memory data bus 5 can be changed for each security level other than the highest level.

FIG. 12A and FIG. 12B are explanatory views showing an operation of the comparator according to Embodiment 3, and shows an example of comparison between data when three security levels are set. FIG. 12A shows an example of security levels and data bits each as an object for comparison in the comparator 41, and also shows that comparison is made for data bits 0, 1, 2 each among latch circuits correlated to the security level 1 (lowest level), security level 2, and security level 3 (highest level) respectively.

FIG. 12B shows an example of security levels and data bits each as an object for comparison in the comparator 42, and also shows that comparison is made for the data bits 3 and 4 between latch circuits correlated to the security level 2 and security level 3 respectively, comparison is made for the data bits 5 and 6 among latch circuits correlated to the security levels 1 to 3 respectively, and comparison is made for the data bit 7 between latch circuits correlated to the security level 1 and security level 3 respectively.

As described above, with the semiconductor integrated circuit according to Embodiment 3, the multiplexed latch circuit 16 of the semiconductor integrated circuit according to Embodiment 1 further comprises a plurality of comparators 41 and 42 each for comparing data for the latch circuit 21 correlated to the lowest security level 1 to data for the latch circuit 23 correlated to the highest security level 2 and outputting a inconsistency signal when it is decided that both data are inconsistent to each other; and the counters 43 and 44 correlated to the comparators each for outputting an operation stop signal when counting a number of occurrences of the inconsistency signal reaches the prespecified number, and also numbers and structures of data bits each as an object for comparison are different from each other in the comparators 41 and 42, so that, in addition to the effect by the semiconductor integrated circuit according to Embodiment 1, it is possible to enhance prevention of unauthorized access to the semiconductor integrated circuit as well as prevention of tampering with secret data used in an internal circuit.

Next, description is made for a semiconductor integrated circuit according to Embodiment 4. The semiconductor integrated circuit according to Embodiment 4 has different circuit configuration in the multiplexed latch circuit of the semiconductor integrated circuit according to Embodiment 1. Therefore, description is made herein for a multiplexed latch circuit.

Figure 13:
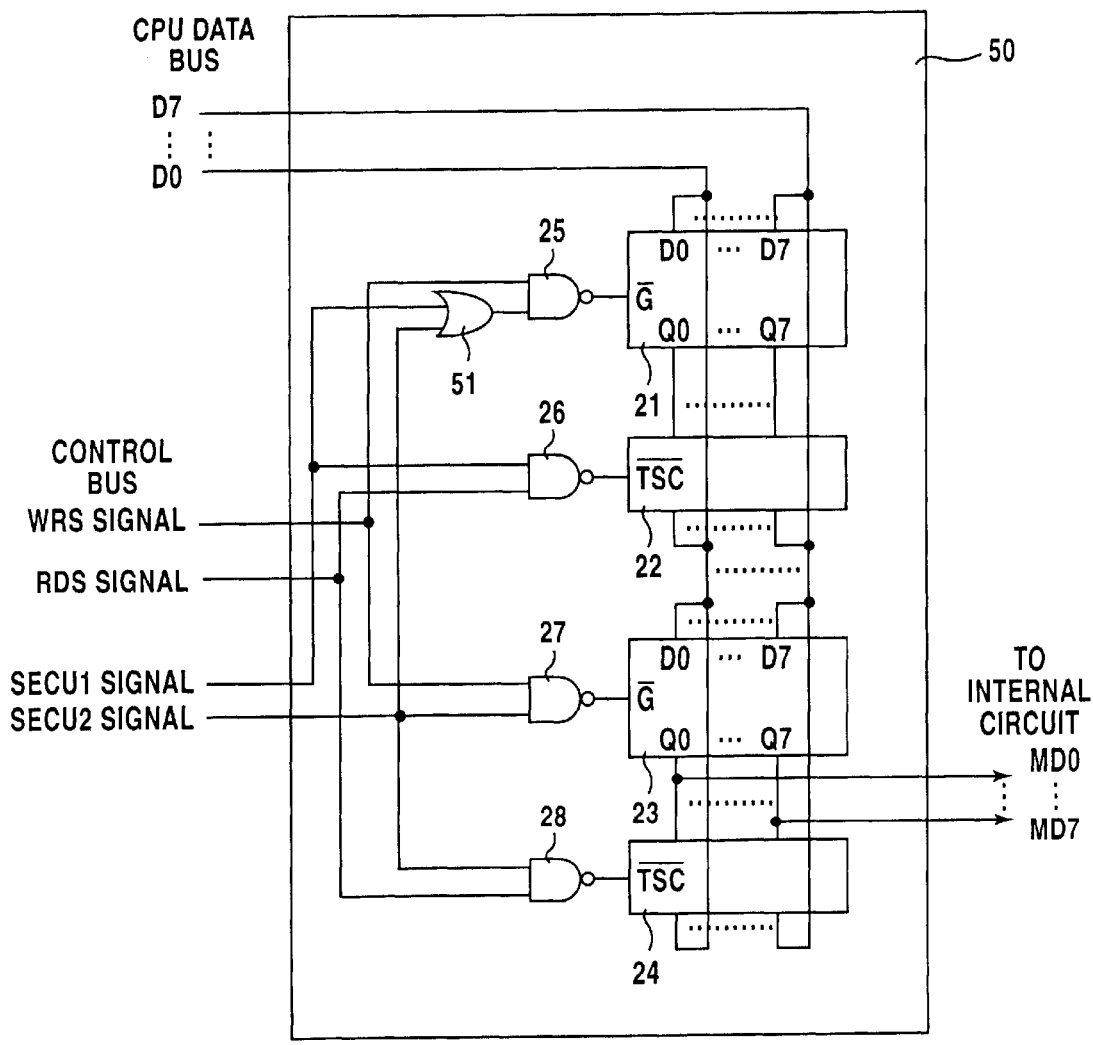
FIG. 13 is a circuit diagram showing circuit configuration of the multiplexed latch circuit in the semiconductor integrated circuit according to Embodiment 4.

FIG. 13 is a circuit diagram showing circuit configuration of the multiplexed latch circuit in the semiconductor integrated circuit according to Embodiment 4. In FIG. 13, the multiplexed latch circuit 50 has a OR gate 51 added to the multiplexed latch circuit 16 shown in Embodiment 1. Configuration and operation of the other components such as the latch circuits 21 and 23, the data bus drivers 22 and 24 and the NAND gates 25 to 28 are as described in Embodiment 1, so that description thereof is omitted herein.

In FIG. 13, the OR gate 51 receives a SECU1 signal as a security signal indicating the security level 1 into one of the input terminals, receives a SECU2 signal as a security signal indicating the security level 2 into the other input terminal thereof, and its output terminal is connected to one of input terminals of the NAND gate 25. It should be noted that, a WRS signal as a write signal is inputted into the other input terminal of the NAND gate 25.

Although each operation of a data read instruction to the multiplexed latch circuit 50 as well as of a data write instruction to the latch circuit 21 correlated to the security level 1 is the same as that of FIG. 6 shown in Embodiment 1 because of the existence of this OR gate 51, the operation of a data write instruction to the latch circuit correlated to the security level 2 is different therefrom.

When the write signal (WRS signal) indicating "H" level is inputted into the multiplexed latch circuit 50, a signal indicating "H" level is inputted into one of input terminals of the NAND gate 25, and as far as a signal level inputted into the other input terminal thereof indicates "H" level, output from the NAND gate 25 indicates "L" level and the latch circuit 21 is activated.

The OR gate 51 outputs, when either of the SECU1 signal and SECU2 signal indicates "H" level, a signal indicating "H" level. Namely, the latch circuit 21 correlated to the security level 1 is activated to perform a latch operation not only when the SECU1 signal indicating the security level 1 shows "H" level but also when the SECU2 signal indicating the security level 2 shows "H" level.

Therefore, data stored in a latch circuit correlated to a higher order security level is also stored in a latch circuit correlated to a lower order security level. With this feature, the data in which writing to a higher order is performed can be read out in the reading operation to the lower security level, and when an unauthorized person tries to prepare an unauthorized program by analyzing a flow of controls for registers executed in this semiconductor integrated circuit, the operation described above can make its analysis difficult.

It should be noted that, a number of security levels is two in Embodiment 4, but more than two levels may be employed, and in that case, it is required to have temporary storage circuits each comprising latch circuits and data bus drivers in correlation to security levels respectively. Especially, in this case, the OR gate as described above is added thereto so that, when a write signal is inputted into a latch circuit correlated to a certain security level and data is to be stored, the same data is also stored in a latch circuit correlated to a lower order security level than the security level. With this feature, not only when a data write instruction is issued to a latch circuit correlated to the highest security level, but also when there exists any latch circuit, for a latch circuit correlated to any of security levels, correlated to a lower order security level than the level, the same data can be stored in the latch circuit correlated to the low order security level.

Further, the Embodiment 4 may be operated by adding the comparator having been described in Embodiment 2 or 3.

As described above, with the semiconductor integrated circuit according to Embodiment 4, the multiplexed latch circuit 16 of the semiconductor integrated circuit according to Embodiment 1 further stores the same data in a latch circuit correlated to a lower security level in the writing operation to a higher order security level, so that, in addition to the effect by the semiconductor integrated circuit according to Embodiment 1, it is possible to make the preparation of an unauthorized program more difficult due to analysis of this semiconductor integrated circuit and also prevent tampering with secret data used in an internal circuit.

Next, description is made for a semiconductor integrated circuit according to Embodiment 5. The semiconductor integrated circuit according to Embodiment 5 has different circuit configuration in the multiplexed latch circuit of the semiconductor integrated circuit according to Embodiment 1. Therefore, description is made herein for a multiplexed latch circuit.

Figure 14:
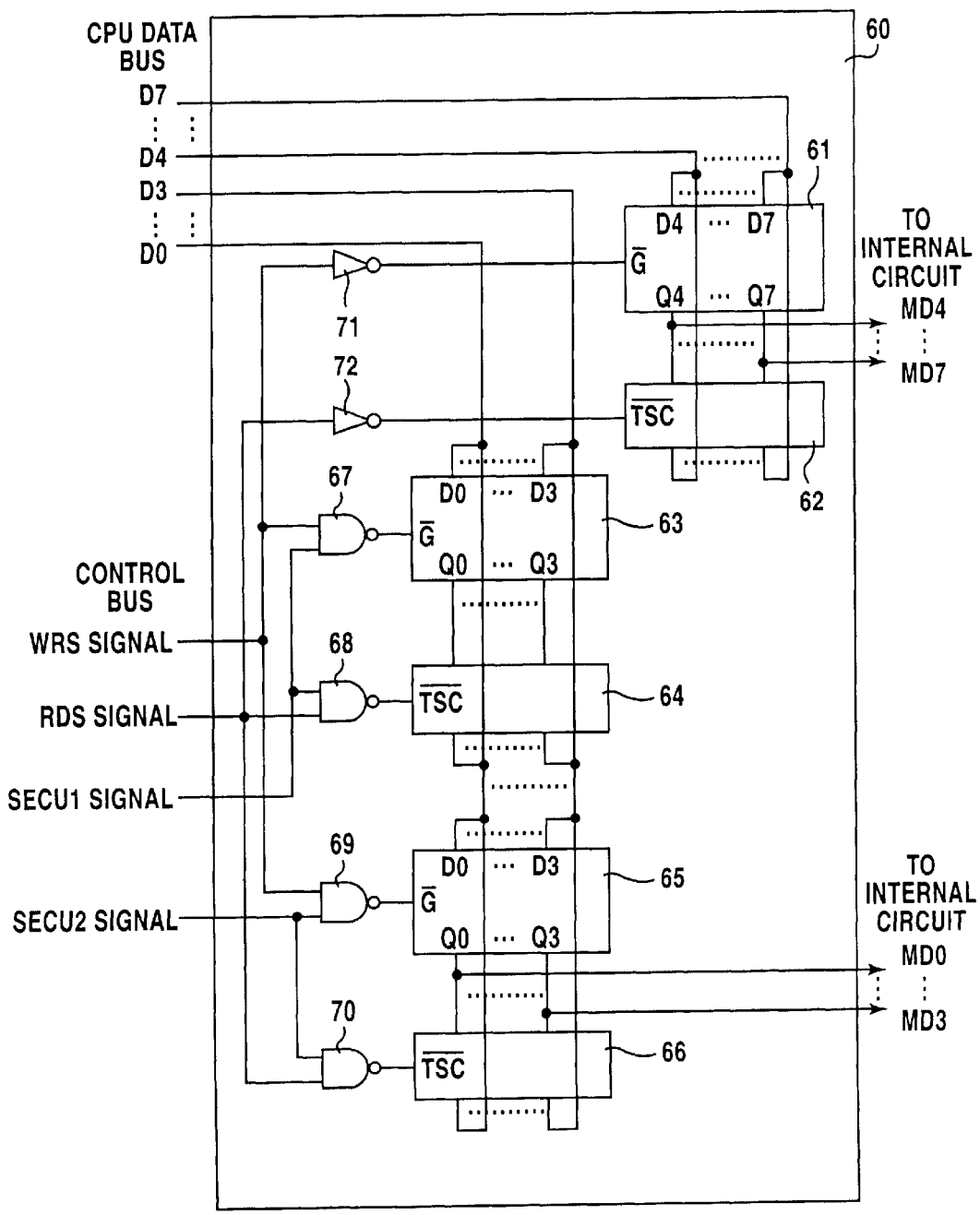
FIG. 14 is a circuit diagram showing circuit configuration of the multiplexed latch circuit in the semiconductor integrated circuit according to Embodiment 5.

FIG. 14 is a circuit diagram showing circuit configuration of the multiplexed latch circuit 60 in the semiconductor integrated circuit according to Embodiment 5. In FIG. 14, the multiplexed latch circuit 60 comprises a latch circuit 61 for receiving data D4 to D7 on the CPU data bus 4, a data bus driver 62 for reading out data stored in the latch circuit 61 and outputting the read-out data onto the CPU data bus 4 as the data D4 to D7, a latch circuit 63 correlated to the security level 1 for receiving data D0 to D3 on the CPU data bus 4, a data bus driver 64 correlated to the security level 1 f or reading out data stored in the latch circuit 63 and outputting the read-out data onto the CPU data bus 4 as the data D0 to D3, a latch circuit 65 correlated to the security level 2 f or receiving data D0 to D3 on the CPU data bus 4, and a data bus driver 66 correlated to the security level 2 f or reading out data stored in the latch circuit 65 and outputting the read-out data onto the CPU data bus 4 as the data D0 to D3.

It should be noted that, the latch circuits 61, 63, 65 and data bus driver 62, 64, 66 are activated by receiving "L" level signal to each enable terminal thereof respectively.

Also the multiplexed latch circuit 60 has four NAND gates 67 to 70. The output of the NAND gate 67 is connected to an enable terminal of the latch circuit 63, receives a SECU1 signal from one of the input terminals and receives a WRS signal from the other input terminal thereof. Accordingly, the NAND gate 67 outputs, as far as both the SECU1 signal and WRS signal show "H" level, a signal indicating "L" level, so that the latch circuit 63 can be activated, namely can latch the data D0 to D3 on the CPU data bus 4 to store the data therein.

The output of the NAND gate 68 is connected to an enable terminal of the data bus driver 64, receives a SECU1 signal from one of the input terminals and receives a RDS signal from the other input terminal thereof. Accordingly, the NAND gate 68 outputs, as far as both the SECU1 signal and RDS signal show "H" level, a signal indicating "L" level, so that the data bus driver 64 can be activated, namely the data stored in the latch circuit 63 can be outputted as data D0 to D3 onto the CPU data bus 4.

The output of the NAND gate 69 is connected to an enable terminal of the latch circuit 65, receives a SECU2 signal from one of the input terminals and receives a WRS signal from the other input terminal thereof. Accordingly, the NAND gate 69 outputs, as far as both the SECU1 signal and WRS signal show "H" level, a signal indicating "L" level, so that the latch circuit 65 can be activated, namely can latch the data D0 to D3 on the CPU data bus 4 to store the data therein.

The output of the NAND gate 70 is connected to an enable terminal of the data bus driver 66, receives a SECU2 signal from one of the input terminals and receives a RDS signal from the other input terminal thereof. Accordingly, the NAND gate 70 outputs, as far as both the SECU2 signal and RDS signal indicate "H" level, a signal indicating "L" level, so that the data bus driver 66 can be activated, namely the data stored in the latch circuit 65 can be outputted as data D0 to D3 onto the CPU data bus 4.

Further, the output of the latch circuit 65 correlated to security level 2 as the highest security level as well as the input of the data bus driver 66 are connected to each other in correlation to data MD0 to MD3 respectively. Accordingly, the data stored in the latch circuit 65 can be outputted to an internal circuit as the data MD0 to MD3.

Thus, the multiplexed latch circuit 60 can be connected, as far as the security level signal indicating the highest security level is inputted thereinto as "H" level, to the CPU data bus 4 through a latch circuit or a data bus driver correlated to the highest security level, and access to the internal circuit can be made.

Further, the multiplexed latch circuit 60 has two inverters 71 and 72. The output of the inverter 71 is connected to an enable terminal of the latch circuit 61, and receives a WRS signal from an input terminal thereof. Accordingly, the inverter 71 outputs, as far as the WRS signal indicates "H" level, a signal indicating "L" level, so that the latch circuit 61 can be activated, namely can latch data D4 to D7 on the CPU data bus 4 to store the data therein.

The output of the inverter 72 is connected to an enable terminal of the data bus driver 62, and receives a RDS signal from an input terminal thereof. Accordingly, the inverter 72 outputs, as far as the RDS signal indicates "H" level, a signal indicating "L" level, so that the data bus driver 62 can be activated, namely data stored in the latch circuit 61 can be outputted as the data D4 to D7 onto the CPU data bus 4.

As described above, in the latch circuits and data bus drivers provided therein in correlation to security levels respectively, a bit as a portion of data is allocated to each of the components, and input and output of data into and from remaining bits are performed with a set of a latch circuit and a data bus driver, so that it is possible to reduce a number of latches required for latch circuits and prevent increase in circuit scale. It should be noted that, bits allocated to the latch circuits and data bus drivers provided in correlation to security levels respectively may be continuous bits on the CPU data bus 4, or may be discrete bits, therefore, the number of bits to be allocated is selectable as required for designing.

It should be noted that, a number of security levels is two in Embodiment 5, but more than two levels may be employed, and in that case, it is also required to have temporary storage circuits each comprising latch circuits and data bus drivers in correlation to security levels respectively.

Further, the Embodiment 5 may be operated by adding the comparator described in Embodiment 2 or 3 or the OR gate described in Embodiment 4.

As described above, with the semiconductor integrated circuit according to Embodiment 5, there are provided pairs, which are equivalent to the number of prespecified security levels by the multiplexed latch circuit 60, comprising a first latch circuit 61 and a first data bus driver 62 for relaying between the CPU 12 and the internal circuit for a portion of data on the CPU data bus 4, second latch circuits 63 and 65 for receiving data in the other portion on the CPU data bus 4 from the CPU 12 to store the data therein, and second data bus drivers 64 and 66 for outputting the data stored in the latch circuits 63 and 65 according to a read instruction and the security level signal from the CPU 12, and only the data stored in the second latch circuits 63 and 65 correlated to the highest security level is outputted to the internal circuit, so that, in addition to the effect by the semiconductor integrated circuit according to Embodiment 1, it is possible to reduce a number of latches required for latch circuits and prevent increase in circuit scale.

Next, description is made for a semiconductor integrated circuit according to Embodiment 6. The semiconductor integrated circuit according to Embodiment 6 has different circuit configuration in the multiplexed latch circuit of the semiconductor integrated circuit according to Embodiment 1. Therefore, description is made herein for a multiplexed latch circuit.

Figure 15:
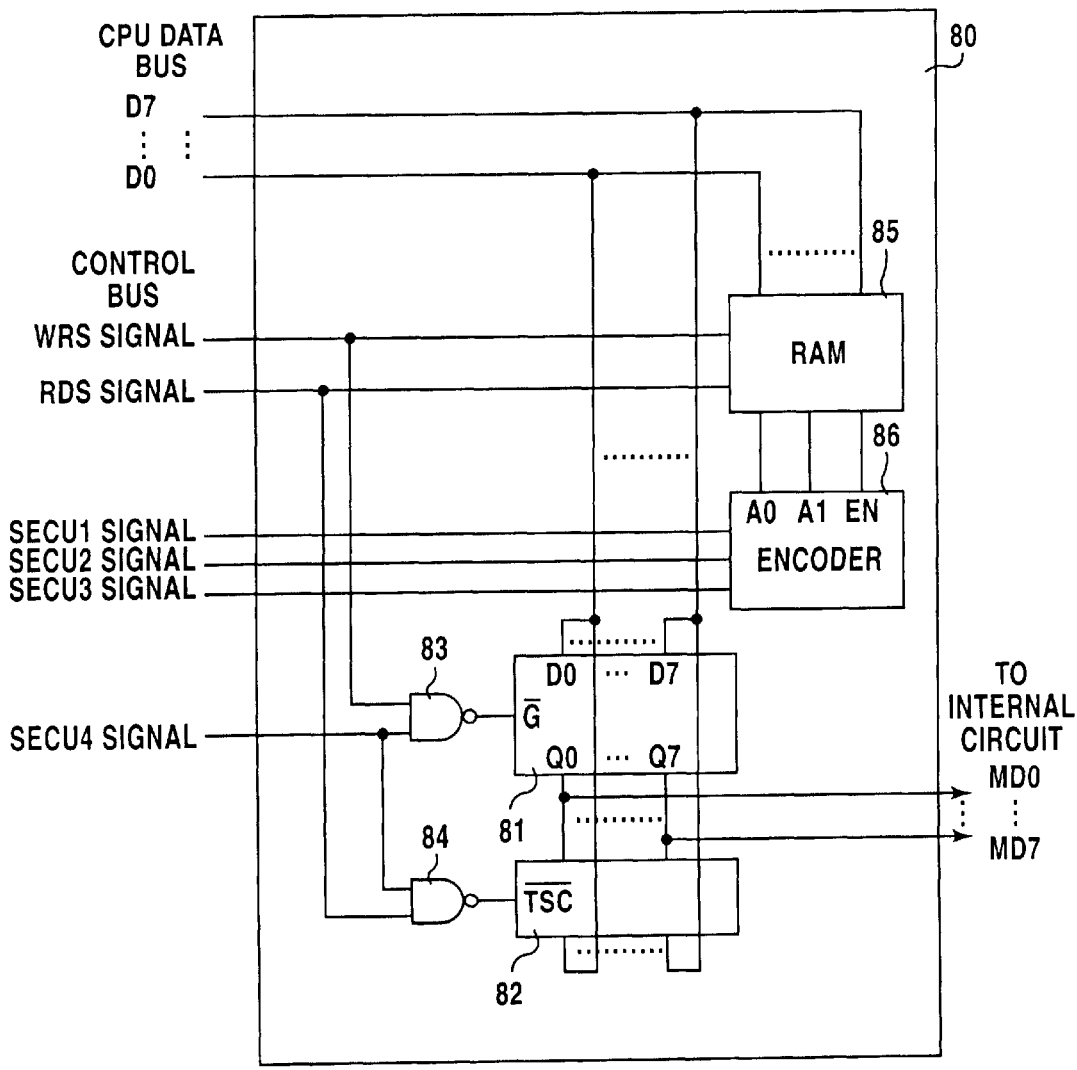
FIG. 15 is a circuit diagram showing circuit configuration of the multiplexed circuit in the semiconductor integrated circuit according to Embodiment 6.

FIG. 15 is a circuit diagram showing circuit configuration of the multiplexed circuit 80 in the semiconductor integrated circuit according to Embodiment 6. In FIG. 15, the multiplexed circuit 80 comprises a latch circuit 81 for receiving data D0 to D7 on the CPU data bus 4, and a data bus driver 82 for reading out data stored in the latch circuit 81 and outputting the read-out data onto the CPU data bus 4. It should be noted that, the latch circuit 81 and data bus driver 82 are activated each by receiving a signal indicating "L" level in each enable terminal thereof respectively.

FIG. 15 shows the multiplexed circuit 80 with the number of security levels set to four, and security signals indicating security levels 1 to 4 are correlated to a SECU1 signal, a SECU2 signal, a SECU3 signal and a SECU4 signal respectively. Accordingly, in this example, the SECU4 signal shows the highest security level.

The multiplexed circuit 80 has two NAND gates 83 and 84. The output of the NAND gate 83 is connected to an enable terminal of the latch circuit 81, receives a SECU4 signal from one of the input terminals and receives a WRS signal from the other input terminal thereof. Accordingly, the NAND gate 83 outputs, as far as both the SECU4 signal and WRS signal show "H" level, a signal indicating L level, so that the latch circuit 81 can be activated, namely can latch the data D0 to D7 on the CPU data bus 4 to store the data therein.

The output of the NAND gate 84 is connected to an enable terminal of the data bus driver 82, receives a SECU4 signal from one of the input terminals and receives a RDS signal from the other input terminal thereof. Accordingly, the NAND gate 84 outputs, as far as both the SECU4 signal and RDS signal show "H" level, a signal indicating "L" level, so that the data bus driver 82 can be activated, namely the data stored in the latch circuit 81 can be outputted onto the CPU data bus 4.

Further, outputs Q0 to Q7 of the latch circuit 81 and inputs of the data bus driver 82 are connected to an internal circuit. Accordingly, data stored in the latch circuit 81 can be outputted to the internal circuit as data MD0 to MD7.

The multiplexed circuit 80 has a RAM 85 connected to the CPU data bus for receiving a WRS signal and a RDS signal, and an encoder 86. The encoder 86 receives SECU1, SECU2 and SECU3 signals, and inputs an A0 signal and an A1 signal each indicating an address on the RAM 85 and an EN signal indicating an enable signal for the RAM 85 into the RAM 85 according to those security signals.

The RAM 85 corresponds to a latch circuit and a data bus driver correlated to security levels other than the highest level having been described in Embodiments 1 to 5. For example, when the WRS signal and SECU1 signal show "H" level, namely when a write instruction to the security level 1 is issued from the CPU 12, at first, the encoder 86 inputs address values correlated to the SECU1 signal into the RAM 85 as A0 and A1 signals. At this point of time, a EN signal indicating "H" level is also inputted into the RAM 85. The RAM 85 identifies a storage in the RAM 85 from the inputted A0 and A1 signals, and stores the data on the CPU data bus 4 in the identified storage according to the WRS signal indicating "H" level.

On the other hand, when the RDS signal and SECU1 signal show "H" level, namely when a read instruction to the security level 1 is issued from the CPU 12, the encoder 86 inputs address values correlated to the SECU1 signal into the RAM 85 as A0 and A1 signals. At this point of time, a EN signal indicating "H" level is also inputted into the RAM 85. The RAM 85 identifies a storage in the RAM 85 from the inputted A0 and A1 signals, and outputs the data stored in the identified storage onto the CPU data bus 4 according to the RDS signal indicating "H" level.

As described above, when SECU1, SECU2 and SECU3 signals each as security signals indicating security levels other than the highest level are issued, the CPU 12 can not get access to the internal circuit, so that input and output of data only into and from a storage in the RAM 85 are performed.

Thus, the multiplexed circuit 80 can establish connection, as far as a security level signal indicating the highest security level is received as THE level, to the CPU data bus 4 through the latch circuit or the data bus driver each correlated to the highest security level, and also allows access to the internal circuit.

It should be noted that, the latch circuit 81 and data bus driver 82 each correlated to the highest security level can be configured with the RAM 85 and encoder 86 included therein. In addition, the RAM 85 is not necessarily a volatile memory, and may be a nonvolatile memory such as a FRAM.

Also a number of security levels is four in Embodiment 6, but more or less than this number may be employed, but configuration correlated to security levels other than the highest level is realized on the RAM, so that, for a comparatively larger number of security levels, it is also possible to suppress increase in circuit scale to the minimum as compared to the case where the latch circuit and data bus driver are used.

As described above, with the semiconductor integrated circuit according to Embodiment 6, there are provided in the multiplexed latch circuit 80, a pair comprising the latch circuit 81 for receiving data on the CPU data bus 4 from the CPU 12 to store the data therein according to a write instruction as well as to the highest security level signal from the CPU 12, and the data bus driver 82 for outputting data stored in the latch circuit 81 to the CPU 12 according to a read signal and the security level signal from the CPU 12; the encoder 86 for outputting an address signal according to a security level signal other than the highest level; and the RAM 85 for inputting and outputting data into and from the CPU 12 according to write/read instructions from the CPU 12 as well as to an address signal from the encoder 86, and the CPU 12 can get access to the internal circuit only for a security signal indicating the highest security level, so that in addition to the effect by the semiconductor integrated circuit according to Embodiment 1, for a comparatively larger number of security levels, it is also possible to suppress increase in circuit scale to the minimum as compared to the case where the latch circuit and data bus driver are used. Especially, the semiconductor integrated circuit is effective when there is a large number of security levels therein.

It should be noted that, in Embodiments 1 to 6, data outputted to the CPU data bus or to the memory data bus consists of 8 bits, but the number of bits is not particularly important.

As described above, with the invention, only data in a prespecified security level can be outputted to a specified circuit for using the data, and data in security levels other than the level can be prevented from being outputted to the specified circuit even if writing is executed to the data, so that it is possible to provide a semiconductor integrated circuit having a security function of preventing data used in a specified circuit from being tampered with, and also making it difficult to acquire any hints used for the purpose that an unauthorized program for tampering with the secret data is created and sophisticated.

According to one feature of the present invention, by outputting data stored in a storage circuit correlated to a security level, an impression that writing of data to a specified circuit had been performed can be given to the operator, so that it is possible to provide a semiconductor integrated circuit which makes it further difficult to handle with an unauthorized program by an unauthorized user, and can more securely prevent tampering with data.

According to one feature of the present invention, an operation stop signal is outputted when the counting of data-inconsistency reaches a prespecified number, which allows unauthorized writing not to be performed for more than the prespecified number of times, so that it is possible to provide a semiconductor integrated circuit which makes it more difficult to acquire any hints used for the purpose that an unauthorized program for tampering with data is created and sophisticated, and can more securely prevent tampering with data.

According to one feature of the present invention, bits of data to be compared are changed for each storage circuit and only the changed bits are compared to each other, so that it is possible to provide a semiconductor integrated circuit in which there is no need to compare all the bits, can compare data to each other with higher speed, and can more securely prevent tampering with data.

According to one feature of the present invention, by storing the same data as that stored in a storage circuit correlated to a prespecified security level in a storage circuit other than the storage circuit, an impression that writing of data, data to be written actually used in a specified circuit, had been performed can be given to the operator, so that it is possible to provide a semiconductor integrated circuit which makes it more difficult to acquire any hints used for the purpose that an unauthorized program for tampering with data is created and sophisticated, and can more securely prevent tampering with data.

According to one feature of the present invention, only a portion of data to be written to a specified circuit is stored in a specified storage circuit of the register, so that it is possible to provide a semiconductor integrated circuit which can make capacity of the storage circuit smaller, perform the processing of writing/reading data in/from the register at a high speed, and can more effectively prevent tampering with data.

According to one feature of the present invention, a storage circuit is realized with a latch circuit, so that it is possible to provide a semiconductor integrated circuit which can perform writing/reading of data at a high speed, and can more effectively prevent tampering with data.

According to one feature of the present invention, a storage circuit is realized with a RAM or a FRAM, so that so that it is possible to provide a semiconductor integrated circuit which can minimize a register and more effectively prevent tampering with data.

This application is based on Japanese patent application No. HEI 10-253405 filed in the Japanese Patent Office on Sep. 8, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit comprising:

a register having a plurality of storage circuits for storing therein written data, said register stores the data in a specified storage circuit of the plurality of storage circuits correlated to security levels for writing/reading of the data and connecting only the storage circuit correlated to a prespecified security level of the security levels to a specified circuit using the data.

2. A semiconductor integrated circuit according to claim 1; wherein the register has an output circuit for outputting, when there is a request to read data, the data stored in any storage circuit correlated to the security level among the plurality of storage circuits.

3. A semiconductor integrated circuit according to claim 1; wherein the register has one or a plurality of comparators for comparing, when data is newly stored in a storage circuit correlated to the security level, the data to the data stored in the storage circuit correlated to the prespecified security level, and outputting an inconsistency signal when it is determined that the compared data is inconsistent to each other; and one or a plurality of counters for counting inconsistency signals outputted from the comparator and outputting an operation stop signal when a result of the counting reaches a prespecified number.

4. A semiconductor integrated circuit according to claim 2; wherein the register has one or a plurality of comparators for comparing, when data is newly stored in a storage circuit correlated to the security level, the data to the data stored in the storage circuit correlated to the prespecified security level, and outputting an inconsistency signal when it is determined that the compared data is inconsistent to each other; and one or a plurality of counters for counting inconsistency signals outputted from the comparator and outputting an operation stop signal when a result of the counting reaches a prespecified number.

5. A semiconductor integrated circuit according to claim 3; wherein the comparator changes bits of data to be compared for each storage circuit with the data to be compared stored therein.

6. A semiconductor integrated circuit according to claim 4; wherein the comparator changes bits of data to be compared for each storage circuit with the data to be compared stored therein.

7. A semiconductor integrated circuit according to claim 1; wherein the register stores the same data as data to be stored in the storage circuit in a storage circuit correlated to a lower security level than the security level to which the storage circuit is correlated.

8. A semiconductor integrated circuit according to claim 1; wherein the register stores a portion of written data in the storage circuit.

9. A semiconductor integrated circuit according to claim 1; wherein the storage circuit comprises a latch circuit.

10. A semiconductor integrated circuit according to claim 1; wherein each of the plurality of storage circuits comprises one or a plurality of RAMs or FRAMs.

* * * * *